(12) United States Patent
Huffman

(10) Patent No.: US 6,232,703 B1
(45) Date of Patent: May 15, 2001

(54) MULTIPLE ELECTRODE IGNITER

(75) Inventor: James A. Huffman, Topsfield, MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/219,160

(22) Filed: Dec. 22, 1998

(51) Int. Cl.$^7$ ...................................................... H02T 13/20
(52) U.S. Cl. ........................... 313/140; 313/141; 313/130; 123/169 R
(58) Field of Search ..................................... 313/140, 141, 313/130, 131 R, 137; 123/169 R

(56) References Cited

U.S. PATENT DOCUMENTS

| | | |
|---|---|---|
| 1,288,242 | 12/1918 | Sippel . |
| 1,424,526 | 8/1922 | Seely . |
| 2,262,769 | 11/1941 | King . |
| 2,487,319 | 11/1949 | Ellis, Jr. . |
| 2,836,756 | 5/1958 | Smits . |
| 2,963,620 * | 12/1960 | Knudson et al. ........................ 315/35 |
| 3,394,285 | 7/1968 | Lindsay . |
| 3,956,664 | 5/1976 | Rado et al. . |

* cited by examiner

Primary Examiner—Nimeshkumar D. Patel
Assistant Examiner—Karabi Guharray
(74) Attorney, Agent, or Firm—Andrew C. Hess; Rodney M. Young

(57) ABSTRACT

An igniter for a combustor of a gas turbine comprises a ground shell electrical conductor which provides the electrical ground path back to the spark source. The spark source connects to the conductor and a ground return path connects to the ground shell. Multiple ignition spark source electrical conductors are used in the single igniter. At least one insulator isolates the spark sources from each other and from the ground shell conductor. An electrical connection, typically a connector that would mate with an ignition source electrical lead having a source conductor, a ground conductor, and insulation to separate these conductors, mates with a spark source to operate the igniter.

13 Claims, 6 Drawing Sheets

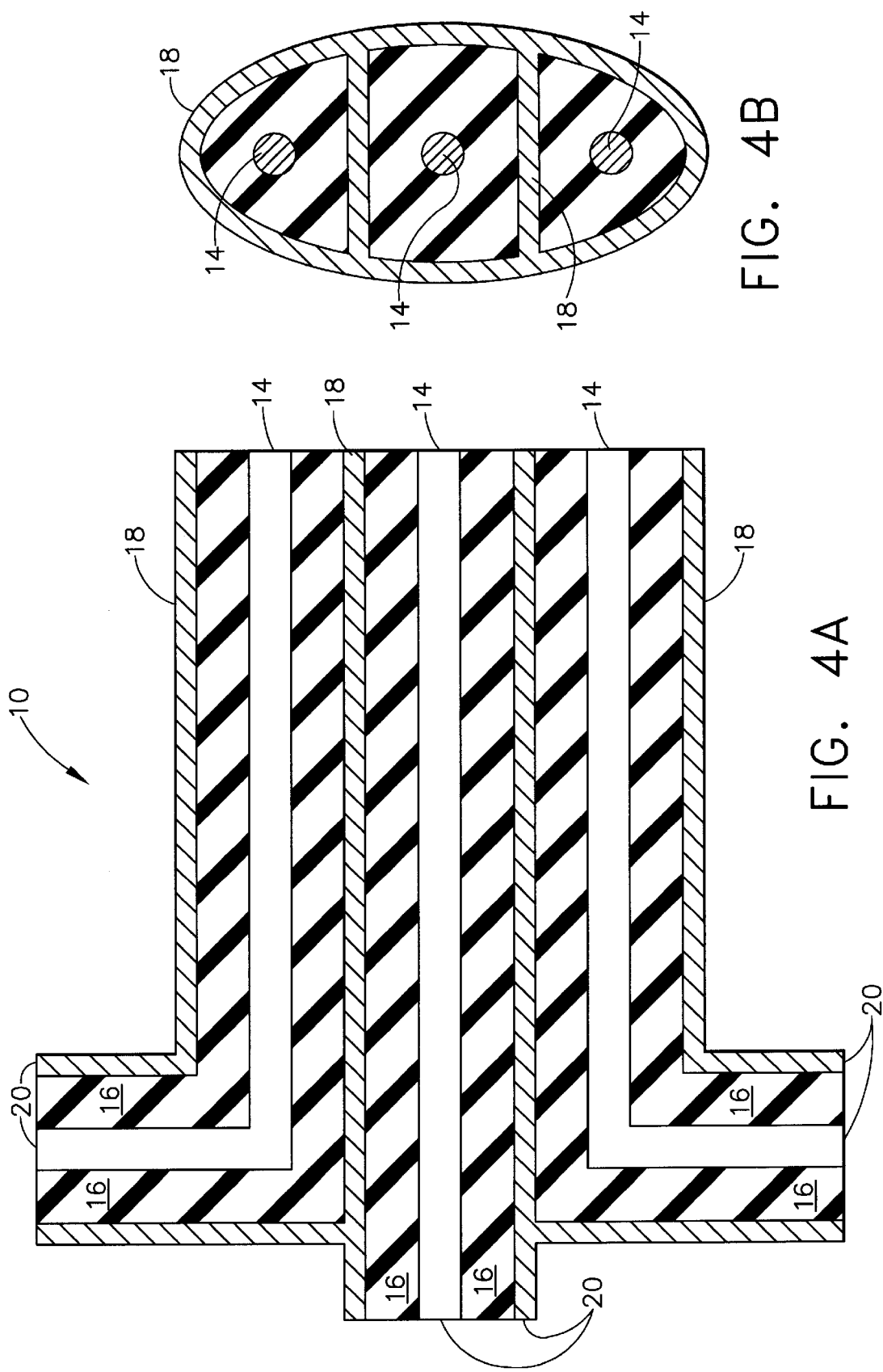

MULTIPLE ELECTRODE IGNITER

TECHNICAL FIELD

The present invention relates in general to electrical igniters and more particularly to a multiple electrode igniter for igniting a fuel-air mixture in a combustor of a gas turbine engine.

BACKGROUND OF THE INVENTION

Multitude existing engines, such as aircraft engines, and also including automobile, marine, industrial and other engines, require an igniter for initiating and maintaining combustion in the engine. An igniter for the combustor of a gas turbine engine permits the production of an electrical spark across a gap formed between oppositely charged electrodes. The spark so produced is effective for igniting a combustible fuel-air mixture within the combustor.

Igniters in the existing art typically use one electrode as a source for the spark. This does not permit a second source to be connected directly to the igniter. In some existing art, a single electrode source for the spark is split internally to provide multiple sparking points. This existing art requires ground electrodes. One example of an existing igniter is that disclosed in U.S. Pat. No. 4,275,559 wherein an igniter is affixed to a combustion chamber with the electrodes extending a short distance to an ignition position in the combustor. This device includes spring retention of the electrodes in the ignition position. The spring permits the electrodes to retract from the combustor in the presence of high pressure within the combustor, as occurs once ignition is attained.

In order to provide redundancy and enhance safety, existing systems often require the use of a second igniter. However, use of a second igniter can significantly impact cost, weight and complexity.

It would be desirable to be able to increase system reliability without requiring a second, or additional, igniter.

SUMMARY OF THE INVENTION

The present invention provides for a multiple electrode igniter which can increase system reliability without requiring additional igniters.

In accordance with one aspect of the present invention, an igniter for a combustor of a gas turbine comprises a ground shell electrical conductor; at least two ignition spark source electrical conductors; at least one insulator to isolate the spark sources from each other and from the ground shell conductor; and a pair of electrical connection points, typically a connector that would mate with an ignition source electrical lead having a source conductor, a ground conductor, and insulation to separate these conductors.

In the drawings as hereinafter described, various embodiments are depicted; however, other modifications and alternative constructions can be made thereto without departing from the true spirit and scope of the invention.

BRIEF DESCRIPTION OF THE DRAWING

The novel features of the invention are set forth with particularity in the appended claims. The invention itself, however, both as to organization and method of operation, together with objects and advantages thereof, may best be understood by reference to the following description taken in conjunction with the accompanying drawing in which:

FIGS. 4A and 4B illustrate a cutaway view and a tip end top view, respectively, of a triple electrode igniter in accordance with the present invention;

DETAILED DESCRIPTION OF THE INVENTION

The present invention proposes a multiple electrode igniter for the combustor of a gas turbine engine to permit the production of an electrical spark formed between oppositely charged electrodes. The multiple electrode igniter of the present invention provides a reliable ignition source and can be used to reduce or eliminate the need for additional or backup ignition sources.

Figure 1:
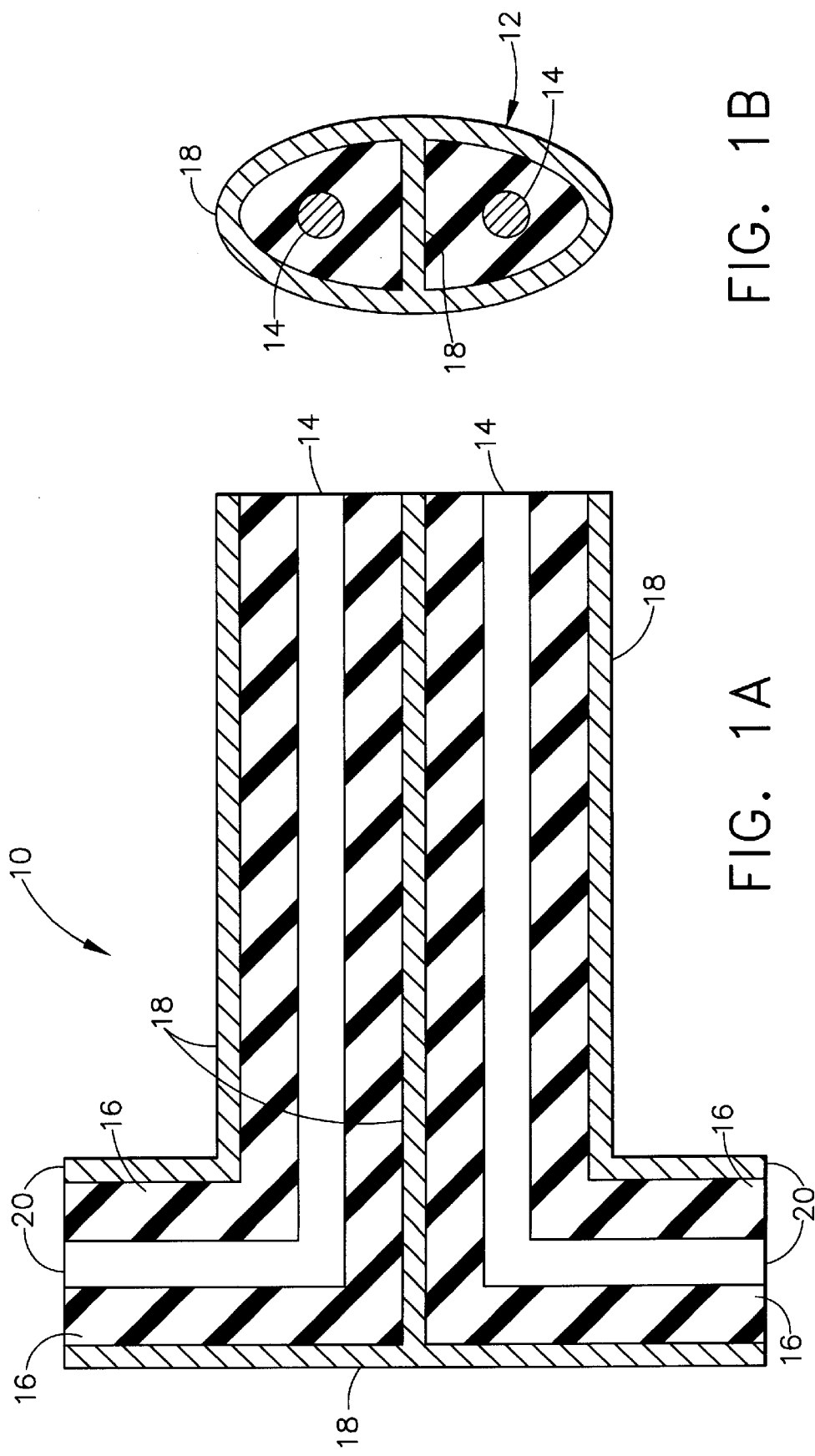
FIGS. 1A and 1B illustrate a cutaway view and a tip end top view, respectively, of a dual electrode igniter in accordance with the present invention.

Referring to the drawings, FIGS. 1A and 1B illustrate a dual electrode igniter 10 constructed in accordance with the present invention. Tip end 12 shows the two source electrical conductors 14, of the dual electrode igniter 10. The multiple conductors 14 can be independently activated, with operation of each of the dual electrical paths being via the source conductors. Associated insulators 16 isolate the spark sources 14 from each other and from a ground shell conductor 18 which provides the electrical ground path back to the ignition source. The center ground shell provides additional surface area for the spark. It could be eliminated is that area is not required to reduce weight or simplify the design. Electrical connection points 20 typically comprise a connector means that mates with an ignition source electrical lead. The ignition source electrical lead typically comprises a source conductor, a ground conductor and insulation to separate these conductors.

Figure 2:
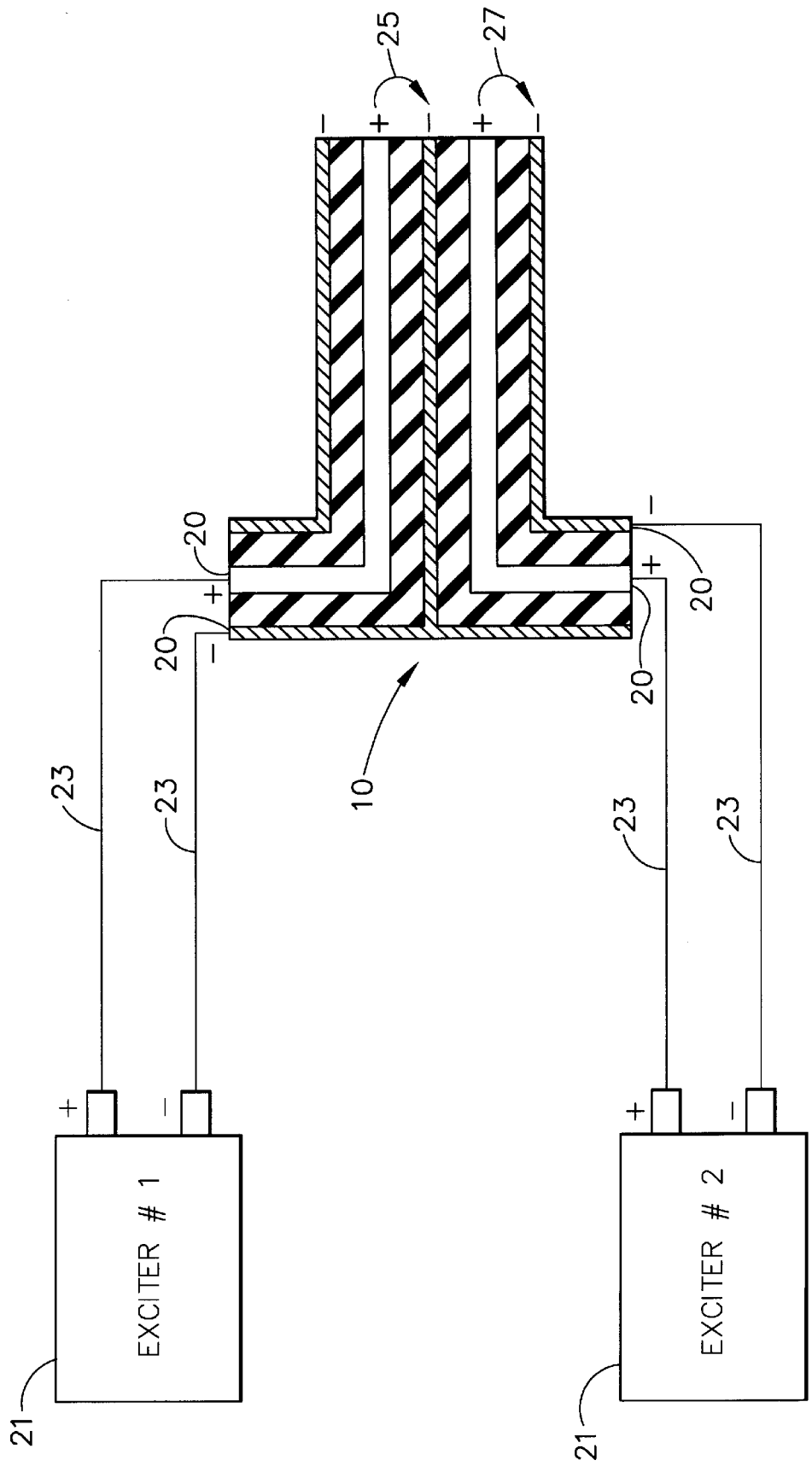
FIG. 2 is a schematic block diagram illustrating application of the dual electrode igniter of FIGS. 1A and 1B.

Referring now to FIG. 2, operation of the igniter dual electrode 10 is produced by a spark electrical source such as one or more ignition exciters 21 connected via the electrical source connection points 20 along the ignition source electrical leads 23. One spark is produced at the igniter tip between the igniter dual electrode conductor and the ground shell at location 25, and a second spark is produced between the second igniter dual electrode conductor and the ground shell at location 27.

Figures 3A, 3B:
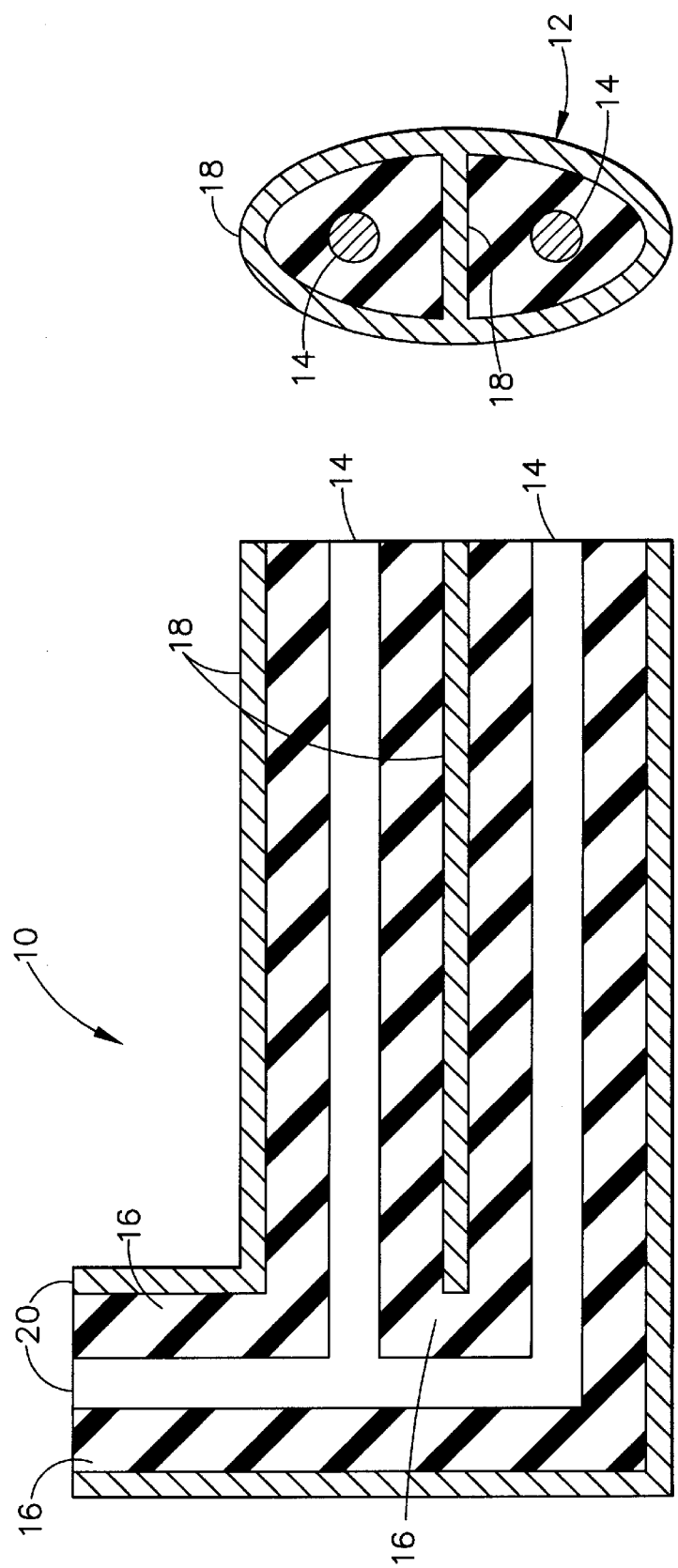
FIGS. 3A and 3B illustrate a cutaway view and a tip end top view, respectively, of the dual electrode igniter of FIGS. 1A and 1B according to an alternative embodiment.

Another embodiment of the dual electrode igniter of FIGS. 1A and 1B is shown in FIGS. 3A and 3B, to illustrate an alternative configuration. In FIG. 3A, the division of the two source electrical conductors 14 is made internal to the igniter 10. The embodiment of FIGS. 3A and 3B may be advantageous when there is only one ignition source, since providing two discharge paths allows the igniter to spark even if one side erodes or fails such that there is not sufficient energy to produce a spark on that side.

In another embodiment of the present invention, as illustrated in FIGS. 4A and 4B, the multiple electrodes may comprise more than two electrodes. For example, three electrodes 14 are illustrated in FIGS. 4A and 4B, rather than the two electrodes 14 illustrated in FIGS. 1A and 3A.

Figures 5A, 5B:
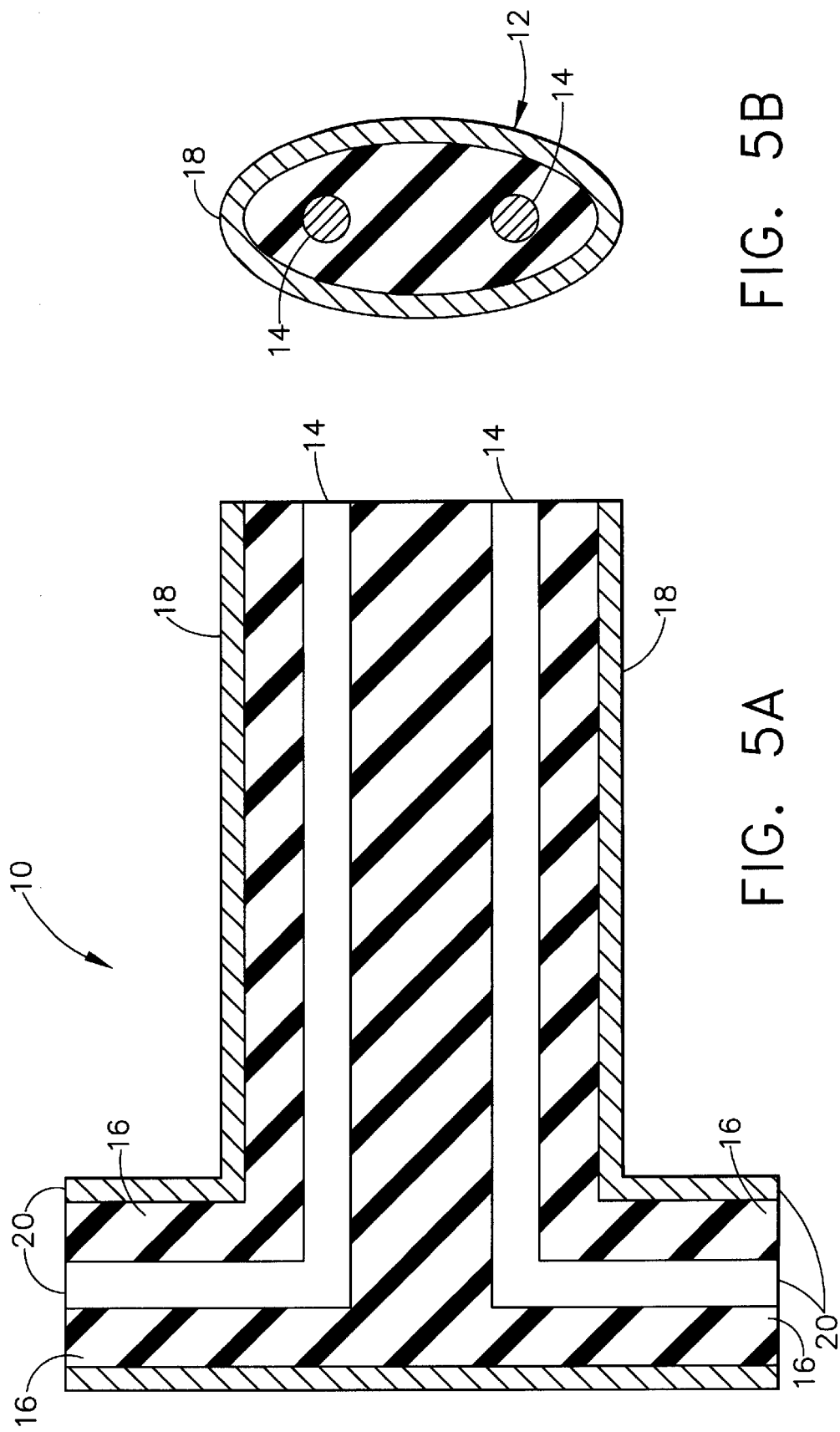
FIGS. 5A and 5B illustrate a cutaway view and a tip end top view, respectively, of the dual electrode igniter shown in Figs 1A and 1B according to an alternative embodiment.

Another embodiment of the present invention is illustrated in FIGS. 5A and 5B. As seen in FIGS. 5A and 5B, the portion of the ground shell 18 internal to the igniter-dual conductor 10 has been eliminated, leaving only the more exterior portion of the ground shell 18. Such a configuration can be potentially advantageous from a weight or manufacturing perspective.

Figure 6:
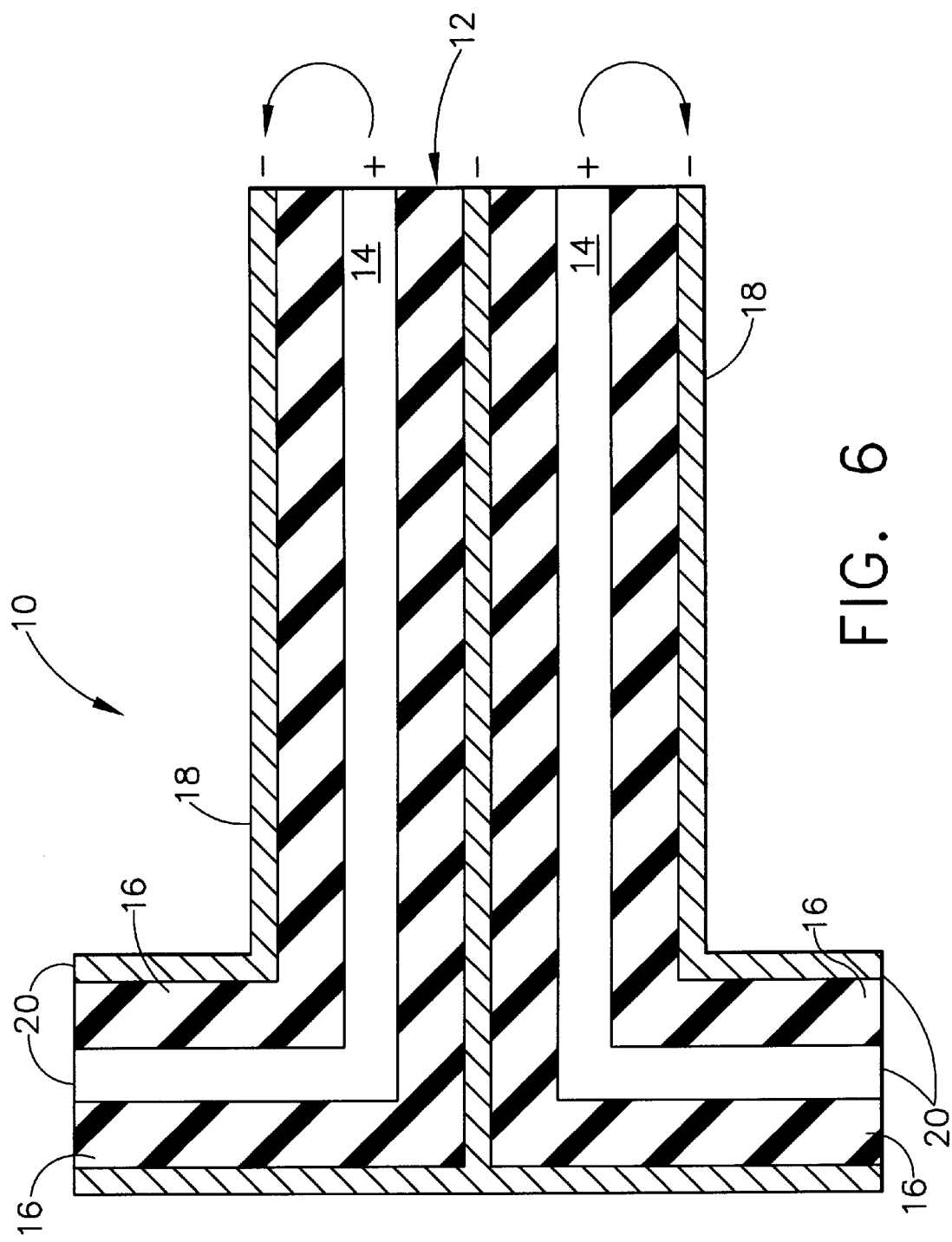
FIG. 6 illustrates the current flow path for the multiple electrode igniter shown in FIG. 1A.

Turning now to FIG. 6, there is illustrated the multiple electrode igniter of the present invention, showing the current flow path. In this embodiment, the current flow path from the conductors 14 to the ground shell 18 is independent for each conductor 14 at tip 12 of the igniter 10. Each electrical source such as a capacitive discharge ignition exciter would discharge, causing a spark to occur across the gap between that conductor 14 and the ground shell 18.

While certain embodiments of the present invention have been shown and described herein, it will be obvious to those skilled in the art that such embodiments are provided by way of example only. Numerous variations, changes, and substitutions will now occur to those skilled in the art without departing from the invention, and those skilled in the art will recognize that the principles of the present invention could be easily adapted or modified to achieve goals in various arrangements. Accordingly, it is intended that the invention be limited only by the spirit and scope of the appended claims.

What is claimed is:

1. An igniter for a combustor of a gas turbine engine, comprising:
    at least one ignition spark source;
    three ignition spark source electrical conductors;
    a ground shell electrical conductor which provides an electrical ground path back to the at least one ignition spark source from the three ignition spark source electrical conductors;
    at least one insulator to isolate the three spark source electrical conductors from each other and from the ground shell electrical conductor; and
    at least one electrical connection means to mate with an ignition source electrical lead for the igniter.

2. An igniter as claimed in claim 1 wherein the three ignition spark source electrical conductors are divided internal to the igniter.

3. An igniter as claimed in claim 1 wherein the ground shell electrical conductor comprises an exterior portion exterior to the at least one insulator, and an interior portion interior to the igniter.

4. An igniter as claimed in claim 1 wherein the ground shell electrical conductor comprises an exterior portion exterior to the at least one insulator.

5. An igniter as claimed in claim 1 further comprising a center ground shell to provide additional surface area for a spark.

6. An igniter as claimed in claim 1 wherein the at least one electrical connection means comprises electrical connection to at least one ignition exciter.

7. An igniter for a combustor of a gas turbine engine, comprising:
    at least one ignition spark source;
    at least two ignition spark source electrical conductors;
    a ground shell electrical conductor which provides an electrical ground path back to the at least one ignition spark source from the at least two ignition spark source electrical conductors;
    a center ground shell to provide additional surface area for a spark;
    at least one insulator to isolate the at least two spark source electrical conductors from each other and from the ground shell electrical conductor; and
    at least one electrical connection means to mate with an ignition source electrical lead for the igniter.

8. An igniter as claimed in claim 7 wherein the at least two ignition spark source electrical conductors comprise two ignition spark source electrical conductors.

9. An igniter as claimed in claim 7 wherein the at least two ignition spark source electrical conductors comprise three ignition spark source electrical conductors.

10. An igniter as claimed in claim 7 wherein the at least two ignition spark source electrical conductors are divided internal to the igniter.

11. An igniter as claimed in claim 7 wherein the ground shell electrical conductor comprises an exterior portion exterior to the at least one insulator, and an interior portion interior to the igniter.

12. An igniter as claimed in claim 7 wherein the ground shell electrical conductor comprises an exterior portion exterior to the at least one insulator.

13. An igniter as claimed in claim 7 wherein the at least one electrical connection means comprises electrical connection to at least one ignition exciter.

* * * * *